July 3, 1923.
H. R. TRAPHAGEN
LANDMARKER FOR PLANTERS
Filed July 8, 1920
1,460,457
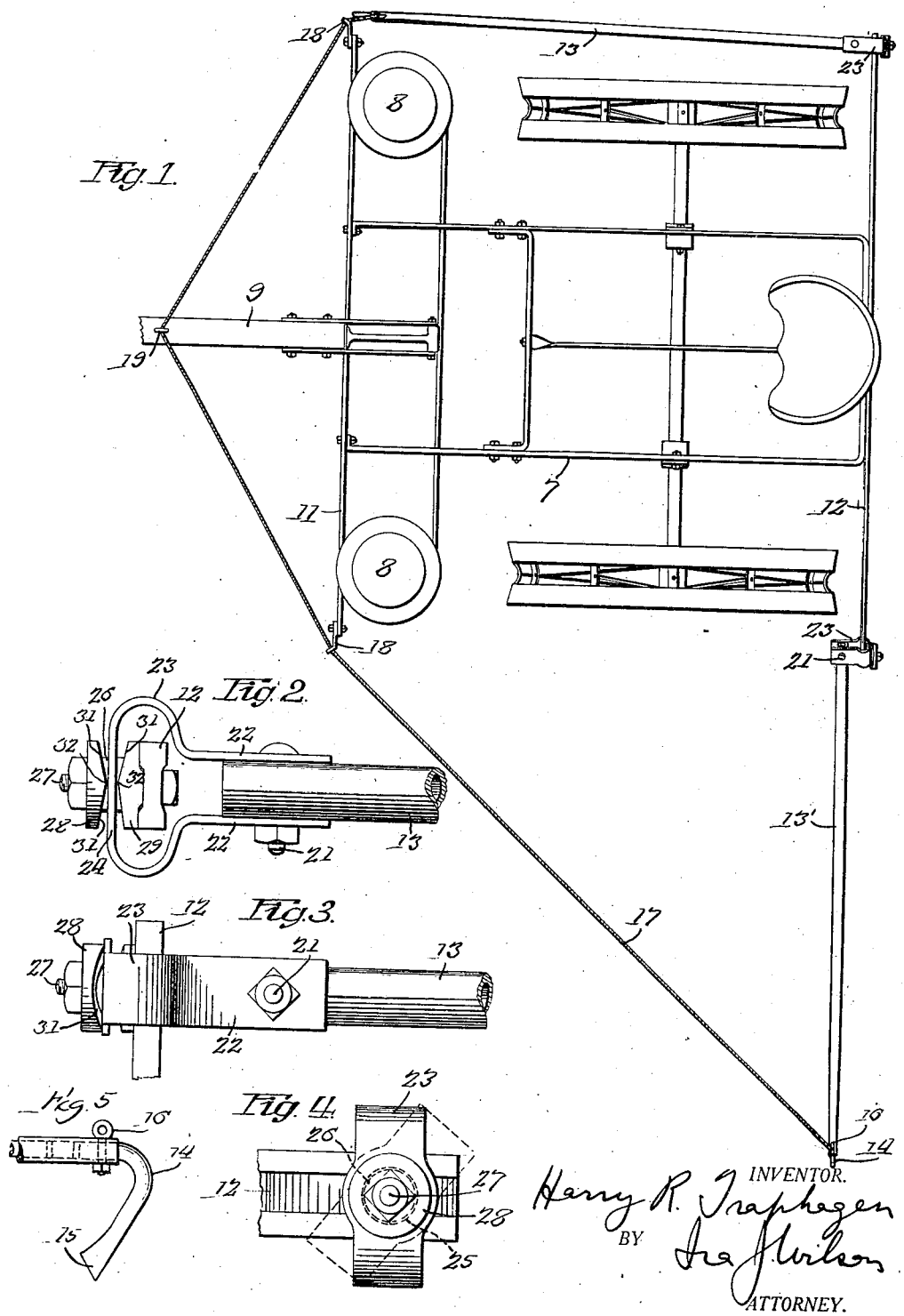

Patented July 3, 1923.

1,460,457

UNITED STATES PATENT OFFICE.

HARRY R. TRAPHAGEN, OF ROCKFORD, ILLINOIS, ASSIGNOR TO EMERSON-BRANTINGHAM COMPANY, OF ROCKFORD, ILLINOIS, A CORPORATION OF ILLINOIS.

LANDMARKER FOR PLANTERS.

Application filed July 8, 1920. Serial No. 394,827.

*To all whom it may concern:*

Be it known that I, HARRY R. TRAPHAGEN, a citizen of the United States, residing at Rockford, in the county of Winnebago and State of Illinois, have invented certain new and useful Improvements in Landmarkers for Planters, of which the following is a specification.

This invention pertains to land markers of that class characterized by a pair of pivoted marker bars, one at each side of the planter, so connected by a rope or cable as to be automatically moved into and out of operative position by the act of turning the planter at the end of the row.

The primary object of the invention is to provide a land marker of this character of generally improved and simplified construction, whereby the desired movements of each marker bar is obtained with but a minimum number of parts, which are constructed in such simple manner as to enable production at a comparatively low cost.

Another object is to provide a marking element for the marker bar, arranged in a novel manner so as to prevent injury to the structure in the event that the planter is drawn forward after commencing to turn about at the end of the row.

Referring to the drawing,—

Figure 1 is a plan view of a planter equipped with a land marker embodying my invention;

Figs. 2, 3, and 4, enlarged detail side, top and end views respectively, of one of the marker-bar connections; and Fig. 5, a front elevation of the blade end of the marker bar.

Inasmuch as my present invention has reference, primarily, to the marker-bar structure, I have deemed it unnecessary to illustrate the planter except in a diagrammatic manner. That shown comprises a wheel-supported frame designated generally by reference character 7, carrying seed boxes 8 and a tongue 9 and including front and rear transverse bars 11 and 12 respectively, upon the outer ends of which are mounted parts of the marking device.

Both marker bars 13 and 13' are pivotally connected to the outer ends of the rear transverse bar 12 through means of novel connecting structures which will be presently described, and each is equipped at its outer end with a marking blade designated generally by character 14, shown in Fig. 5. It will be observed that this blade is turned inwardly and downwardly so that its pointed marking end 15 is disposed substantially at the inner side of the upper end of the blade 14. For purpose of economy in manufacture this blade is made separate from the marker bar 13, preferably of tubular construction, and detachably connected thereto by means of the eye-bolt 16. To this eye-bolt is connected a rope 17 which is guided through eye members 18 on the outer ends of the frame bar 11 and an eye 19 on the tongue. The opposite end of the rope is connected to the eye-bolt on the outer end of the other marker bar 13' in the manner plainly shown in Fig. 1.

The connection between each marker bar and the frame member 12 being similar, a description of one will suffice. As shown in Fig. 2, the bar 13 is interposed between and pivotally connected by means of a bolt 21 to the spaced arms 22 of a yoke 23, which is preferably formed of a single piece of strap iron bent medially upon itself and to such shape as to embrace the bar 12 and allow ample play for oscillation of the member 23 upon a horizontal axis intersecting the bar. The medial portion 24 of the yoke has an opening 25 for the reception of a bearing stud 26 which is supported upon a bolt 27 and confined between blocks 28 and 29, also mounted on the bolt 27, which in turn passes through and is secured to the bar 12. The inner sides of the blocks 28 and 29 are tapered at 31 to provide a fulcrum 32, permitting oscillation of the marker bar on the stud bearing 26 as about a horizontal axis. The marker bar is also capable of oscillation about the axis of the bolt 27, as indicated by dotted lines in Fig. 5, such movement being limited by contact of the curved sides of the member 23 against the bar 12.

In operation, it is desired that the marker bar in marking position, such as the bar 13' (Fig. 1), shall be free to rise and fall at its outer end, to conform to irregularities of the ground, and for this purpose the marking bar will oscillate on the part 26 about the axis of the bolt 27, which it will be observed is horizontal and parallel with the line of draft. When the end of a row is reached and the planter is turned, it is desired that the forward end of the marker bar 13 which has been held elevated, shall drop to the ground, and for this purpose the bar will fulcrum about the point 32, or in other words, will swing about a horizontal axis at right angles to the line of draft. As the planter continues to turn, the marker bar 13, the blade of which engages the ground, will remain substantially stationary as the planter swings away from it in making the turn, this movement being permitted by reason of the pivotal connection 21; and on the other hand, the marker bar 13′ is brought alongside of the planter into operative position, the forward end of this marker bar being lifted from the ground when the opposite bar 13 reaches its operative position. It will thus be seen that each pivotal structure provides for movement of its marking bar about three distinct axes so as to effect the desired movements. The pivotal structure herein described is exceptionally simple and practical and capable of being produced very economically. The object of the inturned blade 14 is to prevent the marking element from digging in the ground in the event that the planter is drawn forwardly after commencing to turn. By reason of my improved blade construction, the blade will slide forwardly over the ground and will not dig in and cause damage to the marker parts and to the planter, as frequently happens with other types of marker bars.

It is believed that the foregoing conveys a clear understanding of my invention, and while I have illustrated and described but a single working embodiment thereof, it should be understood that various changes might be made in the construction without departing from the spirit and scope of the invention as expressed in the appended claims, in which—

I claim:

1. A device of the character described, comprising in combination with a transverse supporting member, a marker bar, a yoke the arms of which embrace said supporting member and extend forwardly therefrom, the marker bar being interposed between the vertically spaced arms of said yoke and pivotally secured thereto by means of a bolt on a vertically disposed axis, whereby the marker bar is adapted to swing horizontally upon said bolt, and means connecting the medial portion of said yoke to said supporting member and permitting the yoke and marker bar to swing vertically about a transverse horizontal axis and to oscillate about a fore-and-aft horizontal axis, such oscillation being limited by contact of the yoke arms against the supporting member.

2. A device of the character described, comprising in combination with a transverse supporting member, a marker bar disposed in front of said member, and a yoke to which the rear end of the marker bar is pivotally connected on a vertical axis, said yoke embracing said supporting member and pivotally connected thereto with capacity to swing about a transverse horizontal axis and a fore-and-aft horizontal axis, movement about said latter axis being limited by contact of the yoke arms against the supporting member.

3. In a device of the character described, a planter frame having a laterally extending bar, a horizontal bolt through the bar, a member bent upon itself to provide parallel arms, said member embracing said bar and pivotally mounted at its medial portion on said bolt so as to pivot about the axis thereof and capable of swinging vertically upon its medial portion, and a marker bar pivotally mounted on a substantially vertical axis upon and between the spaced arms of said member to swing horizontally about said axis.

4. In a device of the character described, the combination with a transverse supporting bar, of a marker bar positioned in front of said transverse bar, and a single part pivotally connected to said marker bar and pivotally connected to said transverse bar, the first pivotal connection permitting the marker bar to swing horizontally about a substantially vertical axis, and the second pivotal connection permitting the marker bar to swing vertically about a horizontal axis transverse to the line of draft and about a horizontal axis parallel with the line of draft.

HARRY R. TRAPHAGEN.